(No Model.)

W. H. WELSH.
WATER CLOSET CONNECTION.

No. 541,647. Patented June 25, 1895.

Witnesses.
H. W. Witcover.
J. H. McKenna.

Inventor.
W. H. Welsh

UNITED STATES PATENT OFFICE.

WILLIAM H. WELSH, OF SAVANNAH, GEORGIA.

WATER-CLOSET CONNECTION.

SPECIFICATION forming part of Letters Patent No. 541,647, dated June 25, 1895.

Application filed October 11, 1894. Serial No. 525,565. (No model.)

*To all whom it may concern:*

Be it known that I, WILLIAM H. WELSH, a citizen of the United States, residing at Savannah, in the county of Chatham and State of Georgia, have invented a new and useful Improvement in Connecting Metal Pipes to Earthenware Water-Closet Bowls; and I do hereby declare the following to be a full, clear, and exact description of the invention, such as will enable others skilled in the art to which it appertains to make and use the same, reference being had to the accompanying drawings and to the letters of reference marked thereon.

The object of the invention is to simplify and cheapen the method of making an adjustable and flexible joint between a water closet bowl and the flush or vent pipe.

The joint as usually made by filling in with cement or sulphur is rigid and very frequently causes the horn of the bowl to be broken off, and the flexible joints now in use either require a projecting flange on inner edge of horn of hopper or consist of several parts which are expensive to manufacture.

The invention consists of a metal connection, threaded at one end to receive the coupling of a flush or vent pipe, and fitted with a shoulder by which it can be held to prevent its turning while the coupling is being screwed on—and tapered from the shoulder to its other end and provided with a rubber gasket.

Figure 1:
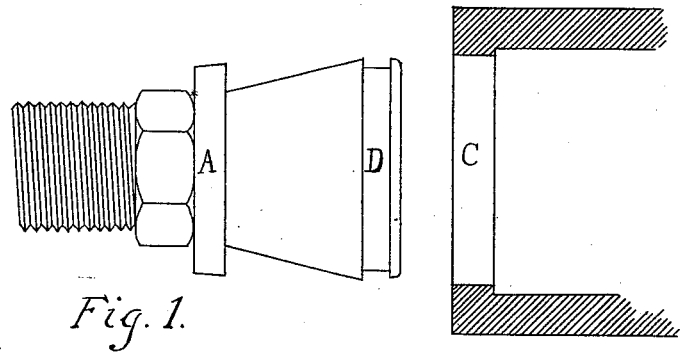
Figure 2:
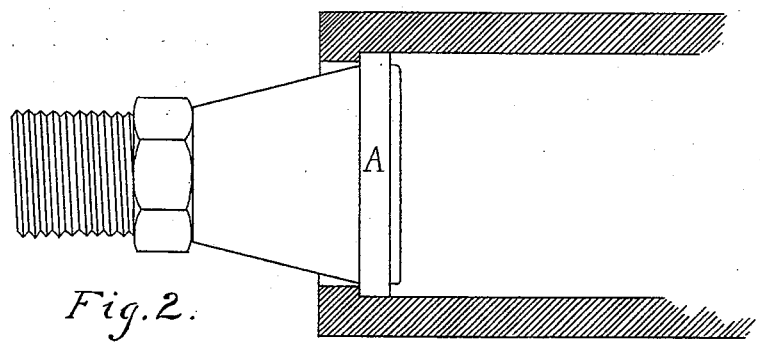
Figure 3:
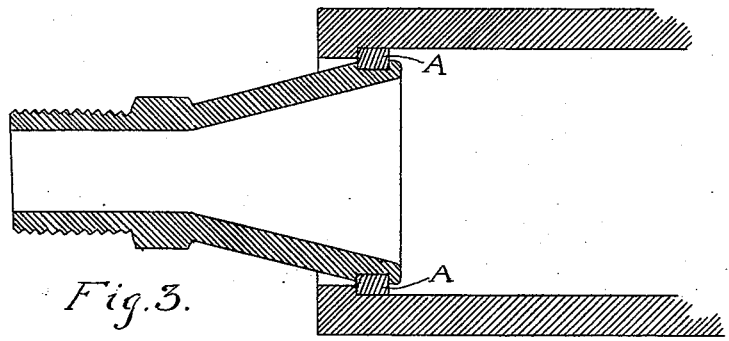

Referring to the accompanying drawings, in which similar letters of reference indicate corresponding parts in each of the figures where they occur, Figure 1 represents an exterior view of connection before putting into place. Fig. 2 represents an exterior view of connection set in place. Fig. 3 represents a section through center of connection set in place.

The connection is used in the following manner: Before inserting it into the horn of a water closet bowl, the rubber gasket A lies at the smaller end of the taper, as shown in Fig. 1, the outside diameter of the gasket being small enough to pass through the opening C in the horn of the bowl. The connection is inserted until the gasket has passed the inner edge of opening C and is then withdrawn, the gasket remaining inside of opening C and being expanded by action of the taper is firmly pressed against the inside of the horn making a tight joint. The flange on inner edge of horn shown at C is not an essential feature of the invention, as the rubber gasket can be expanded without it by temporarily holding a metal washer or other similar appliance against end of horn to keep the gasket inside of same while the coupling is being withdrawn. Near the upper end of the connection there is an annular recess D in which the gasket is held after being expanded. This prevents the gasket from slipping back on the taper and permits inserting the connection to any depth and maintaining a tight joint at any point.

I am aware that rubber rings or gaskets have been used in making joints of this kind and I do not claim the use of rubber rings, gaskets or washers in this style of connection, nor their expansion by means of a tapered ferrule.

In my improvement, the gasket is broad and square edged, giving a large area of contact and being equally tight at whatever depth the connection is inserted it permits adjustment and is flexible in every direction, and as the ferrule and gasket after being expanded can move freely in the horn, without impairing the tightness of the joint, they will yield to the pressure of freezing water and avoid bursting of horn.

Having thus described my invention, what I claim as new, and desire to protect by Letters Patent, is—

In a water closet connection the combination with a rubber gasket of a metal ferrule having a recess at its inserted end adapted to receive the gasket, a projecting shoulder and a tapered portion between the shoulder and recess and smallest near the shoulder adapted to expand the gasket, substantially as described.

W. H. WELSH.

Witnesses:
H. W. WITCOVER,
J. H. MCKENNA.